United States Patent
Yu et al.

(10) Patent No.: US 12,413,073 B2
(45) Date of Patent: Sep. 9, 2025

(54) METHOD AND APPARATUS FOR CONTROLLING POWER OF WIND FARM

(71) Applicant: XINJIANG GOLDWIND SCIENCE & TECHNOLOGY CO., LTD., Xinjiang (CN)

(72) Inventors: Chi Yu, Beijing (CN); Shuowen Xiao, Beijing (CN); Zelin Wang, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 580 days.

(21) Appl. No.: 17/997,789

(22) PCT Filed: Aug. 27, 2020

(86) PCT No.: PCT/CN2020/111659
§ 371 (c)(1),
(2) Date: Nov. 2, 2022

(87) PCT Pub. No.: WO2022/000743
PCT Pub. Date: Jan. 6, 2022

(65) Prior Publication Data
US 2023/0198263 A1    Jun. 22, 2023

(30) Foreign Application Priority Data
Jun. 28, 2020    (CN) .......................... 202010599002.2

(51) Int. Cl.
*H02J 3/38* (2006.01)
*G05B 19/042* (2006.01)
*H02J 13/00* (2006.01)

(52) U.S. Cl.
CPC ............ *H02J 3/381* (2013.01); *G05B 19/042* (2013.01); *H02J 13/00002* (2020.01); *G05B 2219/2619* (2013.01); *H02J 2300/28* (2020.01)

(58) Field of Classification Search
CPC .. H02J 3/381; H02J 13/00002; H02J 2300/28; H02J 3/466; H02J 3/48;
(Continued)

(56) References Cited

U.S. PATENT DOCUMENTS

2009/0096211 A1\*  4/2009  Stiesdal ................... H02J 3/38
                                                                    290/44
2010/0280672 A1    11/2010  Llorente Gonzalez et al.
(Continued)

FOREIGN PATENT DOCUMENTS

CN    101917023 A    12/2010
CN    102709939 A    10/2012
(Continued)

OTHER PUBLICATIONS

The International Search Report mailed Mar. 24, 2021; PCT/2020/111659.
(Continued)

*Primary Examiner* — Ziaul Karim
(74) *Attorney, Agent, or Firm* — Frank Gao, Esq.

(57) ABSTRACT

Provided are a power control method and apparatus for a wind farm. The power control method includes: calculate an adjustable power range for each wind turbine according to a current power output state of each wind turbine in the wind farm, in response to receiving a whole-farm active power adjustment signal for the wind farm sent by a power grid; and calculate a power allocated to each wind turbine based on the adjustable power range for each wind turbine and a whole-farm target power indicated by the whole-farm active power adjustment signal, so as to generate an active power
(Continued)

adjustment command and send the generated active power adjustment command to each wind turbine.

12 Claims, 3 Drawing Sheets

(58) Field of Classification Search
CPC .......... G05B 19/042; G05B 2219/2619; F05B 2270/1033; F05B 2270/327; F05B 2270/335; F03D 7/0276; F03D 7/028; F03D 7/0298; F03D 7/048; Y02E 10/72; Y02E 10/76

See application file for complete search history.

(56) References Cited

U.S. PATENT DOCUMENTS

| | | | |
|---|---|---|---|
| 2011/0229324 | A1 | 9/2011 | Hehenberger |
| 2013/0187384 | A1* | 7/2013 | Li .................... F03D 9/255 290/44 |
| 2014/0001763 | A1 | 1/2014 | Kragelund et al. |
| 2014/0062086 | A1* | 3/2014 | Mata .................. H02J 3/472 290/44 |
| 2015/0148974 | A1* | 5/2015 | Diedrichs .............. F03D 7/048 700/287 |
| 2015/0260159 | A1 | 9/2015 | Jimenez Buendia |
| 2017/0009743 | A1* | 1/2017 | Brogan .................. F03D 7/042 |
| 2017/0009744 | A1* | 1/2017 | Brogan .................... H02J 3/36 |
| 2017/0009745 | A1* | 1/2017 | Brogan .................... G05F 1/12 |
| 2018/0187650 | A1* | 7/2018 | Byreddy ................ F03D 7/028 |
| 2019/0368465 | A1 | 12/2019 | Mandrioli et al. |
| 2020/0011295 | A1 | 1/2020 | Zhang et al. |

FOREIGN PATENT DOCUMENTS

| | | |
|---|---|---|
| CN | 103199562 A | 7/2013 |
| CN | 103758698 A | 4/2014 |
| CN | 104405581 A | 3/2015 |
| CN | 104794576 A | 7/2015 |
| CN | 105914796 A | 8/2016 |
| CN | 206977063 U | 2/2018 |
| CN | 108512258 A | 9/2018 |
| CN | 108736521 A | 11/2018 |
| CN | 109412210 A | 3/2019 |
| CN | 109586332 A | 4/2019 |
| CN | 109931217 A | 6/2019 |
| CN | 110445179 A | 11/2019 |
| CN | 110460111 A | 11/2019 |
| CN | 110529336 A | 12/2019 |
| EP | 2 232 667 B1 | 1/2013 |
| EP | 1 571 746 B1 | 9/2018 |
| EP | 3 575 595 A1 | 12/2019 |
| ES | 2545674 A1 | 9/2015 |
| JP | 2015132988 A | 7/2015 |

OTHER PUBLICATIONS

The First Chilean Office Action dated Aug. 30, 20244; Appln. No. 202203495.

The First Chinese Office Action dated Jan. 11, 2024; Appln. No. 202010599002.2.

The Second Chinese Office Action dated May 13, 2024; Appln. No. 202010599002.2.

H. Namik, et al; "Individual blade pitch control of floating offshore wind turbines", Wind Energy 2010; 13:74-85; Published online Apr. 20, 2009; 12 pages.

The First Australian Office Action dated Jun. 29, 2023; Appln. No. 2020456769.

The Extended European Search Report dated Sep. 8, 2023; Appln. No. 20943711.0.

The First Indian Office Action dated Mar. 21, 2023; Appln. No. 202017056897.

* cited by examiner

METHOD AND APPARATUS FOR CONTROLLING POWER OF WIND FARM

This application is the national phase of International Application No. PCT/CN2020/111659, titled "METHOD AND APPARATUS FOR CONTROLLING POWER OF WIND FARM", filed on Aug. 27, 2020, which claims the priority to Chinese Patent Application No. 202010599002.2, titled "POWER CONTROL METHOD AND APPARATUS FOR WIND FARM", filed on Jun. 28, 2020 with the China National Intellectual Property Administration (CNIPA), both of which are incorporated herein by reference in its entirety.

FIELD

The present disclosure relates to the technical field of wind power generation, and in particular to a power control method and power control apparatus for a wind farm.

BACKGROUND

Due to grid connection requirements on a wind farm, the wind farm will receive an instruction from a grid to control an output active power, which requires a wind turbine to adjust its active power in real time according to demands.

A flexible-tower wind turbine has a high tower, which can acquire better wind energy, but at the same time, leads to a lower natural frequency of the tower. If a sweep frequency of a blade of the wind turbine is close to the natural frequency of the tower, resonance will occur, which may affect the safety of the wind turbine. It may be possible to increase the diameter or wall thickness of the tower to increase the tower frequency, thus to avoid the resonance point. However, this will obviously increase the cost, and therefore, optimizing the tower cannot solve the resonance problem in principle. Thus, the sole feasible way is to avoid the wind turbine operating at a resonance speed through a proper control strategy.

Figure 1:
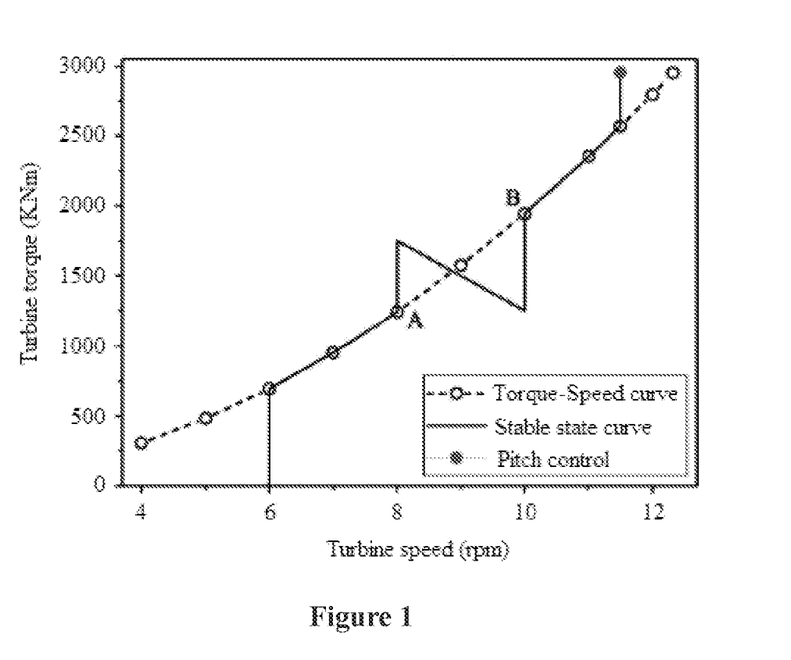
FIG. 1 shows a torque-speed curve of a wind turbine.

Therefore, it is necessary to prevent the wind turbine from operating within a sensitive speed range for a long time. As shown in FIG. 1, FIG. 1 is a torque-speed curve of a wind turbine. Assuming that a range between the speed point A and the speed point B is the sensitive speed range, the wind turbine may implement the speed jump strategy under this operation situation, to prevent the wind turbine from operating within the speed range between A and B for a long time.

If a power grid performs power control on a wind farm containing a flexible-tower wind turbine through an energy platform, power of the flexible-tower wind turbine will inevitably be adjusted, resulting in control of the speed of the flexible-tower wind turbine. If a wind turbine power limit command sent by the energy platform is just close to, or repeatedly traverses, the speed range of speed jump, the safety operation of the wind turbine will probably be affected.

SUMMARY

A power control method and power control apparatus for a wind farm are provided in exemplary embodiments of the present disclosure, thus to propose a power limiting strategy for a flexible-tower wind farm from two perspectives of single-turbine control and farm-level control in one aspect, safeguarding of the flexible-tower wind turbine is realized, and in another aspect, frequent speed jumps or shutdowns of the wind turbine caused by unreasonable power allocation of the farm-level strategy are reduced.

A power control method for a wind farm is provided in an exemplary embodiment of the present disclosure. The power control method is performed by a power control apparatus for the wind farm, and includes: calculating an adjustable power range for each wind turbine according to a current power output state of each wind turbine in the wind farm, in response to receiving a whole-farm active power adjustment signal for the wind farm sent by a power grid; and calculating a power allocated to each wind turbine based on the adjustable power range for each wind turbine and a whole-farm target power indicated by the whole-farm active power adjustment signal, so as to generate an active power adjustment command and send the generated active power adjustment command to each wind turbine.

A power control method for a wind farm is provided in an exemplary embodiment of the present disclosure. The power control method is performed by a wind turbine and includes: receiving an active power adjustment command sent from a power control apparatus for the wind farm; and performing a speed jump operation based on a speed jump power, the active power adjustment command and a current real-time power of the wind turbine.

A power control apparatus for a wind farm is provided in an exemplary embodiment of the present disclosure. The power control apparatus includes: a range calculation unit, configured to calculate an adjustable power range for each wind turbine according to a current power output state of each wind turbine in the wind farm, in response to receiving a whole-farm active power adjustment signal for the wind farm sent by a power grid; and a power calculation unit, configured to calculate a power allocated to each wind turbine based on the adjustable power range for each wind turbine and a whole-farm target power indicated by the whole-farm active power adjustment signal, so as to generate an active power adjustment command and send the generated active power adjustment command to each wind turbine.

A wind turbine for a wind farm is provided in an exemplary embodiment of the present disclosure. The wind turbine includes: a command receiving unit, configured to receive an active power adjustment command sent from a power control apparatus for the wind farm; and a speed jump unit, configured to perform a speed jump operation based on a speed jump power, the active power adjustment command and a current real-time power of the wind turbine.

A wind farm is provided in an exemplary embodiment of the present disclosure. The wind farm includes: a power control apparatus, configured to calculate an adjustable power range for each wind turbine according to a current power output state of each wind turbine in the wind farm, in response to receiving a whole-farm active power adjustment signal for the wind farm sent by a power grid; and calculate a power allocated to each wind turbine based on the adjustable power range for each wind turbine and a whole-farm target power indicated by the whole-farm active power adjustment signal, so as to generate an active power adjustment command and send the generated active power adjustment command to each wind turbine.

A wind farm is provided in an exemplary embodiment of the present disclosure. The wind farm includes at least one wind turbine. Each wind turbine of the at least one wind turbine is configured to: receive an active power adjustment command sent from a power control apparatus for the wind farm; and perform a speed jump operation based on a speed jump power, the active power adjustment command and a current real-time power of the wind turbine.

A wind farm is provided in an exemplary embodiment of the present disclosure. The wind farm includes a farm-end command sending apparatus and at least one wind turbine. The farm-end command sending apparatus includes: a command receiving unit, a power allocation unit, and a communication unit, in which, the command receiving unit is configured to receive a whole-farm active power adjustment signal for the wind farm sent by a power grid system; the power allocation unit is configured to calculate an adjustable power range for each wind turbine according to a current power output state of each wind turbine in the wind farm, in response to the command receiving unit receiving the whole-farm active power adjustment signal for the wind farm sent by a power grid, and allocate power based on the adjustable power range for each wind turbine and a wind-farm target power indicated by the whole-farm active power adjustment signal; the communication unit is configured to send a power allocation result of the power allocation unit to each wind turbine. Each wind turbine of the at least one wind turbine includes a wind turbine control unit, and the wind turbine control unit is configured to perform a speed jump operation, according to a speed jump power, the power allocation result sent by the farm-end command sending apparatus, and a current real-time power of the wind turbine.

A main controller for a wind turbine is provided in an exemplary embodiment of the present disclosure. The main controller includes a processor; and a memory, storing a computer program. The computer program, when executed by the processor, implements the power control method for a wind farm according to the exemplary embodiment of the present disclosure.

A power control system for a wind farm is provided in an exemplary embodiment of the present disclosure. The power control system includes a power grid system and any one of the above wind farms.

A power control system for a wind farm is provided in an exemplary embodiment of the present disclosure. The power control system includes a power control apparatus and a wind turbine. The wind turbine is installed with a main controller, and the power control apparatus is communicatively connected to the main controller of the wind turbine.

A computer-readable storage medium having a computer program stored thereon is provided in an exemplary embodiment of the present disclosure. The computer program, when executed by a processor, implements the power control method for the wind farm according to the exemplary embodiment of the present disclosure.

A computing apparatus is provided in an exemplary embodiment of the present disclosure. The computing apparatus includes a processor, and a memory storing a computer program. The computer program, when executed by the processor, implements the power control method for the wind farm according to the exemplary embodiment of the present disclosure. According to the wind farm, the power control system for the wind farm, the power control method and power control apparatus for the wind farm provided in the exemplary embodiments of the present disclosure, an adjustable power range for each wind turbine is calculated according to a current power output state of each wind turbine in the wind farm, in response to receiving a whole-farm active power adjustment signal for the wind farm sent by a power grid; and a power allocated to each wind turbine is calculated based on the adjustable power range for each wind turbine and a whole-farm target power indicated by the whole-farm active power adjustment signal, so as to generate an active power adjustment command and send the generated active power adjustment command to each wind turbine. The technical solution proposed in the present disclosure have the following advantages of: (1) realizing a control function of the flexible-tower wind farm in response to the active power dispatch in a full power range of the grid; (2) effectively ensuring the safety of the flexible-tower wind turbine during an speed jump operation, and avoiding frequent speed jump operations of the wind turbine when having not recovered to a normal state under an adjustment strategy of a farm-end apparatus to bring about safety risks; (3) preventing the wind turbine from being sent a shutdown command by the farm-end apparatus due to the speed protection of the flexible tower, which will lead to a slow start-up speed when increasing the power and cannot meet the grid assessment indicators. In addition, wind turbines may be divided into N groups. When the power adjustment range is large, a single group or a small number of groups will perform the speed jump action, which may, from the whole-farm perspective, reduce an impact of a large power fluctuation during the speed jump action on an accuracy error of the whole-farm active power output.

Additional aspects and/or advantages of the general concept of the present disclosure will be partially described in the following description, and some of the other aspects and/or advantages of the general concept of the present disclosure will be clear through the description, or may be learned through the implementation of the general concept of the present disclosure.

BRIEF DESCRIPTION OF TRE DRAWINGS

The above and other objectives and features of the exemplary embodiments of the present disclosure will become clearer through the following description in conjunction with the accompanying drawings that exemplarily show the embodiment, in which.

DETAILED DESCRIPTION

The exemplary embodiments of the present disclosure will now be described in its detail. Examples of the embodiments are shown in the accompanying drawings, in which the same reference numerals always refer to the same components. The embodiments will be described below with reference to the drawings, thus to explain the present disclosure.

A wind turbine calculates a power corresponding to a resonance speed, according to a corresponding relationship between speeds and powers, and adds a threshold to obtain a lower limit of an available power. An energy platform shall not allocate to a flexible-tower wind turbine with a power limit less than the lower limit of the available power, but may send a shutdown command. In this way, when adjusting the power of the whole wind farm, the flexible-tower wind turbine is subjected only to a limited power range, and when the active power of the whole farm is still greater than a target power required by a power grid, a speed jump or shutdown operation may be performed on part of wind turbines.

Take the United Power as an example. It may be determined an operation state of each wind turbine according to a real-time speed and a torque of the wind turbine, divided wind turbines of the flexible-tower wind farm into wind turbines with non-adjustable active power and wind turbines with adjustable active power according to a determination result, and performed an accurate energy adjustment on the wind turbines with adjustable active power in the flexible-tower wind farm by an energy dispatch and control method. An energy dispatch system includes a module for determining an operation state of a wind turbine and a module for energy dispatch and control. Only when the adjustable power margin of each wind turbine is not enough under no speed jump, the speed jump operation is performed on part of wind turbines.

The speed jump is an operation performed to prevent the wind turbine from operating in a specific speed range (speed forbidden zone) for a long time, and from switching back and forth in the speed forbidden zone, considered that the tower vibration is easily induced when the wind turbine passes through the resonance zone.

Figure 2:
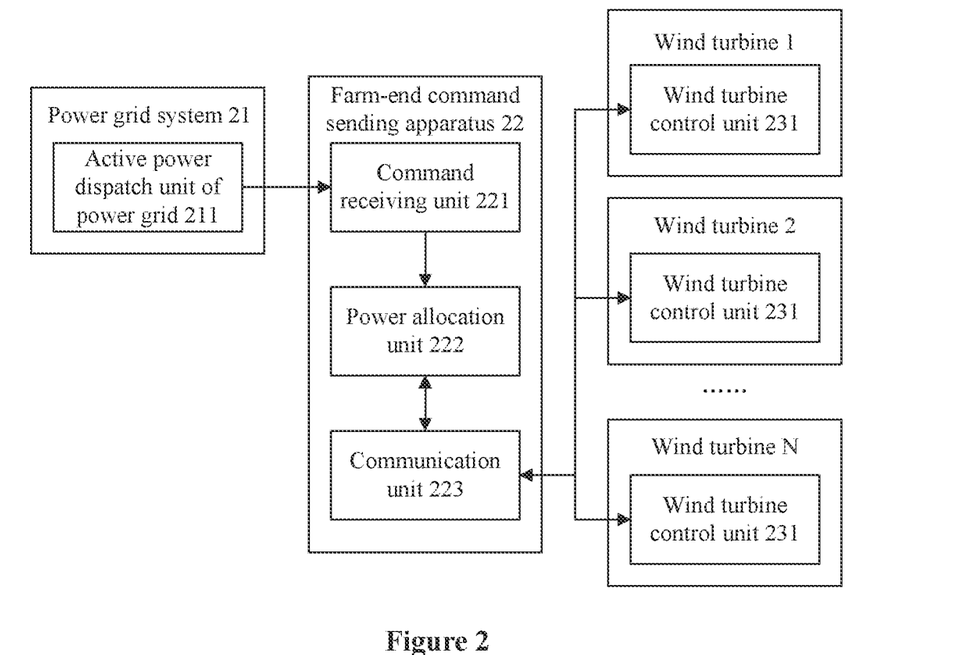
FIG. 2 shows a schematic diagram of a power control system for a wind farm according to an exemplary embodiment of the present disclosure.

FIG. 2 shows a schematic diagram of a power control system for a wind farm according to an exemplary embodiment of the present disclosure.

In FIG. 2, the active power control system 200 includes three major parts: a power grid system 21, a farm-end command sending apparatus 22, and at least one wind turbine (wind turbine 1 to wind turbine N). Here, a farm-end command sending apparatus 22 and at least one wind turbine (wind turbine 1 to wind turbine N) may form a wind farm.

In an exemplary embodiment of the present disclosure, the power grid system 21 includes a power dispatch unit 211 of the power grid, configured for sending a whole-farm active power adjustment signal to the wind farm.

In an exemplary embodiment of the present disclosure, the farm-end command sending apparatus 22 includes a command receiving unit 221, a power allocation unit 222, and a communication unit 223. The command receiving unit 221 is configured to receive a whole-farm active power adjustment signal for the wind farm sent by the power grid system. The power allocation unit 222 is configured to calculate an adjustable power range for each wind turbine according to a current power output state of each wind turbine in the wind farm, in response to receiving the whole-farm active power adjustment signal for the wind farm sent by the power grid; and allocate power based on the adjustable power range for each wind turbine and a whole-farm target power indicated by the whole-farm active power adjustment signal. The communication unit 223 is configured to send a power allocation result of the power allocation unit to each wind turbine.

In an exemplary embodiment of the present disclosure, the power allocation unit 222 may be configured to calculate an adjustable power range for each wind turbine according to a current available maximum power, a current available minimum power, and a current power of each wind turbine.

In an exemplary embodiment of the present disclosure, the power allocation unit 222 may be further configured to perform the following steps for each wind turbine: calculate a difference between the current available maximum power of the wind turbine and the current power of the wind turbine as a maximum increasable power of the wind turbine; calculate a difference between the current available minimum power of the wind turbine and the current power of the wind turbine as a maximum reducible power of the wind turbine. Here, the adjustable power range of the wind turbine includes the maximum increasable power and the maximum reducible power of the wind turbine. In other words, the adjustable power range of the wind turbine may include a maximum increasable power range and a maximum reducible power range of the wind turbine; the maximum increasable power range and the maximum reducible power range are defined by the maximum increasable power and the maximum reducible power, respectively.

In an exemplary embodiment of the present disclosure, the power allocation unit 222 may be configured to group wind turbines in the wind farm according to a total capacity of the wind farm; calculate an adjustable power range for each group of wind turbines according to adjustable power ranges for all wind turbines in the group; allocate power based on the adjustable power range for each group of wind turbines and the whole-farm target power. For example, a number of wind turbines, the sum of whose capacities is less than the 5% of the total capacity of the wind farm may be set as a group. For instance, for a wind farm with a total capacity of 100 MW, wind turbines totally having a capacity of 5 MW may be set as one group. Then, two wind turbines each having 2.5 MW may constitute one group; two wind turbines each having 2.0 MW may constitute one group three wind turbines each having 1.5 MW may constitute one group. Each group includes at least one wind turbine.

In an exemplary embodiment of the present disclosure, the power allocation unit 222 may further be configured to acquire the adjustable power range for each group of wind turbines by adding up adjustable power ranges of all wind turbines in each group of wind turbines.

In an exemplary embodiment of the present disclosure, the power allocation unit 222 may further be configured to calculate a difference between the whole-farm target power and a whole-farm real-time power as a power adjustment range; calculate a ratio or a difference between the maximum increasable power or the maximum reducible power in the adjustable power range for each group of wind turbines and the power adjustment range, to acquire a proximity between the adjustable power range for each group of wind turbines and the power adjustment range; determine at least one group of wind turbines as wind turbines to be performed power adjustment according to the proximity, and set the maximum increasable power or the maximum reducible power in the adjustable power range as the power to be allocated to the wind turbine, for each wind turbine determined to be performed power adjustment.

For example, when a power needs to be decreased, a proximity between the adjustable power range for each group of wind turbines and the power adjustment range is acquired by calculating a difference between a maximum reducible power for each group of wind turbines and the power adjustment range. The group of wind turbines with a largest proximity among groups with a proximity greater than 90% is determined as the group of wind turbines to be performed power adjustment, for each wind turbine in the group of wind turbines with the largest proximity, the maximum reducible power in the adjustable power range thereof is set as the power allocated thereto. For example, when a power needs to be increased, a proximity between the adjustable power range for each group of wind turbines and the power adjustment range is acquired by calculating a difference between a maximum increasable power for each group of wind turbines and the power adjustment range. The group of wind turbines with a largest proximity among groups with a proximity greater than 90% is determined as the group of wind turbines to be performed power adjustment for each wind turbine in the group of wind turbines with the largest proximity, the maximum increasable power in the adjustable power range thereof is set as the power allocated thereto.

For example, when a proximity between the adjustable power range for each group of wind turbines and the power adjustment range is not greater than 90% for each group, a total proximity between a total adjustable power range for two or more groups of wind turbines and the power adjustment range may be calculated. The method for determining the two or more groups of wind turbines as wind turbines to be performed power adjustment according to the total proximity, and the method for allocating power to each wind turbine to be performed power adjustment are similar to that for one group of wind turbines described above, which will not be repeated here.

Specifically, the farm-end command sending apparatus is a control system located inside the wind farm, and cooperates with multiple wind turbines in the wind farm, to jointly realize the function of active power adjustment. The function of the apparatus is to receive a whole-farm active power adjustment signal sent by a power grid, and send a reasonable active power adjustment command to each wind turbine in the wind farm after power allocation based on a state of a wind turbine. The command receiving unit 221 of the farm-end command sending apparatus is used to receive a whole-farm active power adjustment target sent by an active power dispatch unit of the power grid. The power allocation unit 222 of the farm-end command sending apparatus is used to calculate a power target allocated to each wind turbine according to a current state of the wind turbine, so that an overall active power output of the wind farm meets the whole-farm target sent by the power grid. The allocation depends on the current power of the wind turbine, an upper limit of an available power and a lower limit of the available power, and these signals are uploaded from the wind turbine.

The power allocation unit 222 may divide wind turbines including multiple flexible towers into N groups, and perform a power limit operation, with priority, on one or a few of groups when decreasing power or increasing power. The real-time adjustable range for each group of wind turbines may be calculated according, to the maximum available power, minimum available power and current power uploaded by the wind turbine. Here, the maximum increasable power of X groups of wind turbines is represented as $\Sigma X(Pmax-Pr)$, and the maximum reducible power of X groups of wind turbines is represented as $\Sigma X(Pr-Pmin)$. A wind turbine with an adjustable range being close to the adjustable range A is preferably selected to make actions. Here, the power limit operation refers to that, after receiving the power limit command including a target power and time duration information, the wind turbine reduces the power output through control operations such as changing pitch, torque or speed, so as to keep power close to the target power until the command changes or the energy platform cancels the power limit command.

The communication unit 223 of the farm-end command sending apparatus is used to send a calculation result of the power allocation unit to each controlled wind turbine. The communication with the wind turbine may use methods such as profinet, OPC-UA, or the like. While the communication period should not be greater than 10 s, in order to avoid adverse effects due to system delay.

In an exemplary embodiment of the present disclosure, each wind turbine of the at least one wind turbine includes a wind turbine control unit 231, configured to perform a speed jump operation according to a speed jump power, a power allocation result sent from the farm-end command sending apparatus and a current real-time power of the wind turbine.

In an exemplary embodiment of the present disclosure, the wind turbine control unit 231 may be configured to perform the speed jump operation, if the speed jump power is less than a greater one of a single-turbine target power of the wind turbine and the current real-time power, and is greater than a less one of the single-turbine target power of the wind turbine and the current real-time power; and skip the speed jump operation, if the speed jump power is less than a less one of the single-turbine target power of the wind turbine and the current real-time power, or is greater than a greater one of the single-turbine target power of the wind turbine and the current real-time power.

In an exemplary embodiment of the present disclosure, the wind turbine control unit 231 may be further configured to adjust a current available maximum power or a current available minimum power of the wind turbine during a preset waiting period based on the speed jump power, according to a relationship between the current real-time power and the speed jump power, if the speed jump power is less than the greater one of the single-turbine target power of the wind turbine and the current real-time power, and is greater than a less one of the single-turbine target power of the wind turbine and the current real-time power.

In an exemplary embodiment of the present disclosure, the wind turbine control unit 231 may be further configured to adjust the current available maximum power of the wind turbine during the preset waiting period to be equal to the speed jump power, if the current real-time power is greater than the speed jump power and is less than the single-turbine target power of the wind turbine; and adjust the current available minimum power of the wind turbine during the preset waiting period to be equal to the speed jump power, if the current real-time power is less than the speed jump power and is greater than the single-turbine target power of the wind turbine.

Specifically, on the one hand, the wind turbine control unit 231 receives a signal sent from the farm-end command sending apparatus and performs power control of the wind turbine; and on the other hand, the wind turbine control unit 231 uploads a state signal of the wind turbine to the farm-end command sending apparatus. The signals that need to be uploaded include the current available maximum power, the current available minimum power and the current power of the wind turbine.

During normal operation of the wind turbine, a maximum power at a current wind speed is used as an upper limit Pmax of available power, where the maximum power at the current wind speed is obtained from looking up a power curve table. A default minimum power limit under normal operation of the wind turbine is used as a lower limit Pmin of available power, where the default minimum power limit is determined by factors such as component temperature state and wind speed. When a single-turbine target power Pset sent by the farm-end command sending apparatus and the current real-time power Pr are both greater than or both less than the speed jump power Pj at the same time, the wind turbine does not need to perform the speed jump but operates normally. When the single-turbine target power Pset and the current real-time power Pr are not both less than or greater than Pj at the same time, the wind turbine needs to perform a speed jump action. After each speed jump action, it is necessary to wait for a vibration acceleration of the wind turbine to return to the normal range, and then a next speed jump is allowed. During this waiting period, the upper limit or lower limit of the available power may be adjusted to Pj, so as to prevent the farm-end command sending apparatus from triggering the speed jump for power limit during this period.

In another exemplary embodiment of the present disclosure, a wind farm includes a power control apparatus. The power control apparatus is configured to calculate an adjustable power range for each wind turbine according to a current power output state of each wind turbine in the wind farm, in response to receiving a whole-farm active power adjustment signal for the wind farm sent by a power grid; and calculate a power allocated to each wind turbine based on the adjustable power range for each wind turbine and a whole-farm target power indicated by the whole-farm active power adjustment signal, so as to generate an active power adjustment command and send the generated active power adjustment command to each wind turbine.

In another exemplary embodiment of the present disclosure, a wind farm includes at least one wind turbine. Each wind turbine of the at least one wind turbine is configured to receive an active power adjustment command sent from a power control apparatus for the wind farm; perform a speed jump operation based on a speed jump power, the active power adjustment command and a current real-time power of the wind turbine.

In another exemplary embodiment of the present disclosure, a power control system for a wind farm includes a power control apparatus and a wind turbine. The wind turbine is installed with a main controller. The power control apparatus is communicatively connected with a main controller for the wind turbine.

In another exemplary embodiment of the present disclosure, a power control apparatus may be inside or outside the wind farm, which is not limited in the present disclosure.

Figure 3:
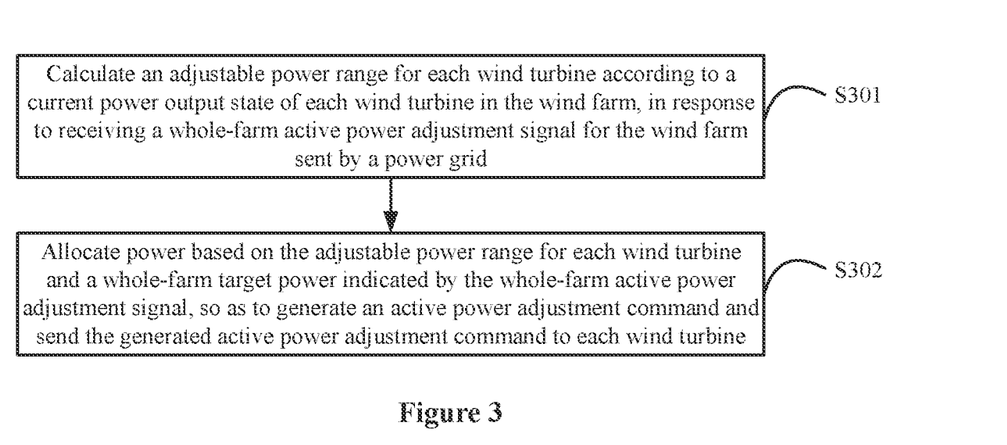
FIG. 3 shows a flow chart of a power control method for a wind farm according to an exemplary embodiment of the present disclosure.

FIG. 3 shows a flow chart of a power control method for a wind farm according to an exemplary embodiment of the present disclosure. The power control method may be performed by a power control system or a power control apparatus for the wind farm.

With reference to FIG. 3, in step S301, an adjustable power range for each wind turbine is calculated according to a current power output state of each wind turbine in the wind farm, in response to receiving a whole-farm active power adjustment signal for the wind farm sent by a power grid.

In an exemplary embodiment of the present disclosure, when calculating an adjustable power range for each wind turbine according to a current power output state of each wind turbine in the wind farm, it may be calculated the adjustable power range for each wind turbine according to a current available maximum power, a current available minimum power and a current power of the wind turbine.

In an exemplary embodiment of the present disclosure, when calculating the adjustable power range for each wind turbine according to the current available maximum power, the current available minimum power and the current power of the wind turbine, it may be performed the following steps for each wind turbine: calculate a difference between the current available maximum power of the wind turbine and the current power as a maximum increasable power of the wind turbine; calculate a difference between the current available minimum power of the wind turbine and the current power as a maximum reducible power of the wind turbine. Here, the adjustable power range of the wind turbine includes the maximum increasable power and the maximum reducible power of the wind turbine. In other words, the adjustable power range of the wind turbine may include a maximum increasable power range and a maximum reducible power range of the wind turbine; the maximum increasable power range and the maximum reducible power range are defined by the maximum increasable power and the maximum reducible power, respectively.

In step S302, a power allocated to each wind turbine is calculated based on the adjustable power range for each wind turbine and a whole-farm target power indicated by the whole-farm active power adjustment signal, so as to generate an active power adjustment command and send the generated active power adjustment command to each wind turbine.

In an exemplary embodiment of the present disclosure, when calculating the power allocated to each wind turbine based on the adjustable power range for each wind turbine and the whole-farm target power indicated by the whole-farm active power adjustment signal, it may be firstly grouped wind turbines in the wind farm based on a total capacity of the wind farm, then calculated an adjustable power range for each group of wind turbines according to adjustable power ranges for all wind turbines in the group, and calculated the power allocated to each wind turbine based on the adjustable power range for each group of wind turbines and the whole-farm target power.

In an exemplary embodiment of the present disclosure, when calculating the adjustable power range for each group of wind turbines according to adjustable power ranges for all wind turbines in the group, it may be acquired the adjustable power range for each group of wind turbines by adding up the adjustable power ranges of all wind turbines in each group of wind turbines.

In an exemplary embodiment of the present disclosure, when calculating the power allocated to each wind turbine based on the adjustable power range for each group of wind turbines and the whole-farm target power, it may be firstly calculated a difference between the whole-farm target power and a whole-farm real-time power as a power adjustment range, calculated a ratio or a difference between the maximum increasable power or the maximum reducible power in the adjustable power range for each group of wind turbines and the power adjustment range, to acquire a proximity between the adjustable power range for each group of wind turbines and the power adjustment range, then determined at least one group of wind turbines as wind turbines to be performed power adjustment according to the proximity, and set the maximum increasable power or the maximum reducible power in the adjustable power range as the power to be allocated to the wind turbine, for each wind turbine determined to be performed power adjustment.

Figure 4:
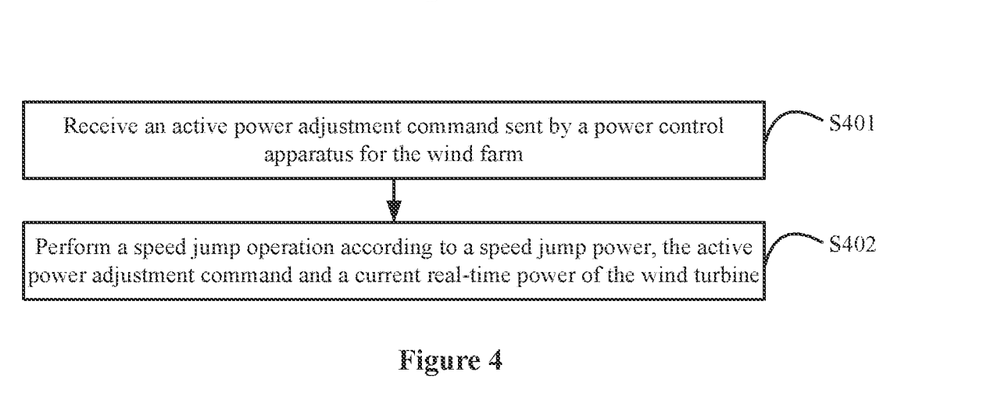
FIG. 4 shows a flow chart of a power control method for a wind farm according to an exemplary embodiment of the present disclosure.

FIG. 4 shows a flow chart of a power control method for a wind farm according to an exemplary embodiment of the present disclosure.

With reference to FIG. 4, in step S401, an active power adjustment command sent from a power control apparatus for the wind farm is received.

In step S402, a speed jump operation is performed according to a speed jump power, the active power adjustment command and a current real-time power of the wind turbine.

In an exemplary embodiment of the present disclosure, when performing the speed jump operation according to the speed jump power, the active power adjustment command and the current real-time power of the wind turbine, the speed jump operation is performed, if the speed jump power is less than a greater one of a single-turbine target power of the wind turbine and the current real-time power, and is greater than a less one of the single-turbine target power of the wind turbine and the current real-time power; and the speed jump operation is skipped, if the speed jump power is less than a less one of the single-turbine target power of the wind turbine and the current real-time power, or is greater than a greater one of the single-turbine target power of the wind turbine and the current real-time power.

In an exemplary embodiment of the present disclosure, if the speed jump power is less than the greater one of the single-turbine target power of the wind turbine and the current real-time power, and is greater than a less one of the single-turbine target power of the wind turbine and the current real-time power, it may be further adjusted a current available maximum power or a current available minimum power of the wind turbine during a preset waiting period based on the speed jump power, according to a relationship between the current real-time power and the speed jump power.

In an exemplary embodiment of the present disclosure, when adjusting the current available maximum power or the current available minimum power of the wind turbine during the preset waiting period based on the speed jump power, it may be adjusted the current available maximum power of the wind turbine during the preset waiting period to be equal to the speed jump power, if the current real-time power is greater than the speed jump power and is less than the single-turbine target power of the wind turbine; and adjusted the current available minimum power of the wind turbine during the preset waiting period to be equal to the speed jump power, if the current real-time power is less than the speed jump power and is greater than the single-turbine target power of the wind turbine.

A wind farm, a power control system for a wind farm, and a power control method for a wind farm according to the exemplary embodiments of the present disclosure have been described above with reference to FIG. 2 to FIG. 4. Hereinafter, a power control apparatus for a wind farm and its units according to the exemplary embodiments of the present disclosure will be described with reference to FIG. 5 and FIG. 6.

Figure 5:
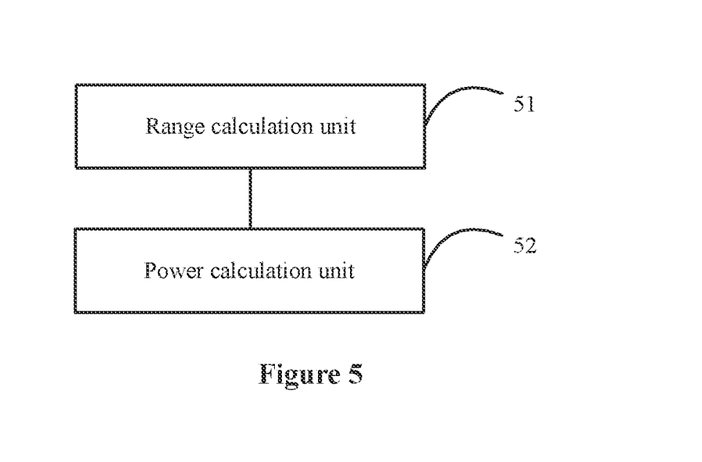
FIG. 5 shows a block diagram of a power control apparatus for a wind farm according to an exemplary embodiment of the present disclosure.

FIG. 5 shows a block diagram of a power control apparatus for a wind farm according to an exemplary embodiment of the present disclosure.

With reference to FIG. 5, the power control apparatus for the wind farm includes a range calculation unit 51 and a power calculation unit 52.

The range calculation unit 51 is configured to calculate an adjustable power range for each wind turbine according to a current power output state of each wind turbine in the wind farm, in response to receiving a whole-farm active power adjustment signal for the wind farm sent by a power grid.

In an exemplary embodiment of the present disclosure, the range calculation unit 51 may be configured to calculate the adjustable power range for each wind turbine according to a current available maximum power, a current available minimum power and a current power of the wind turbine.

In an exemplary embodiment of the present disclosure, the range calculation unit 51 may be further configured to perform the following steps on each wind turbine: calculate a difference between the current available maximum power of the wind turbine and the current power as a maximum increasable power of the wind turbine; calculate a difference between the current available minimum power of the wind turbine and the current power as a maximum reducible power of the wind turbine, and where the adjustable power range of the wind turbine includes the maximum increasable power and the maximum reducible power of the wind turbine.

The power calculation unit 52 is configured to calculate a power allocated to each wind turbine based on the adjustable power range for each wind turbine and a whole-farm target power indicated by the whole-farm active power adjustment signal, so as to generate an active power adjustment command and send the generated active power adjustment command to each wind turbine.

In an exemplary embodiment of the present disclosure, the power calculation unit 52 may be configured to group wind turbines in the wind farm based on a total capacity of the wind farm; calculate an adjustable power range for each group of wind turbines according to adjustable power ranges for all wind turbines in the group; and calculate the power allocated to each wind turbine based on the adjustable power range for each group of wind turbines and the whole-farm target power.

In an exemplary embodiment of the present disclosure, the power calculation unit 52 may be further configured to acquire the adjustable power range for each group of wind turbines by adding up adjustable power ranges of all wind turbines in each group of wind turbines.

In an exemplary embodiment of the present disclosure, the power calculation unit 52 may be further configured to calculate a difference between the whole-farm target power and a whole-farm real-time power as a power adjustment range; calculate a ratio or a difference between the maximum increasable power or the maximum reducible power in the adjustable power range for each group of wind turbines and the power adjustment range, to acquire a proximity between the adjustable power range for each group of wind turbines and the power adjustment range; determine at least one group of wind turbines as wind turbines to be performed power adjustment according to the proximity, and set the maximum increasable power or the maximum reducible power in the adjustable power range as the power to be allocated to the wind turbine, for each wind turbine determined to be performed power adjustment.

Figure 6:
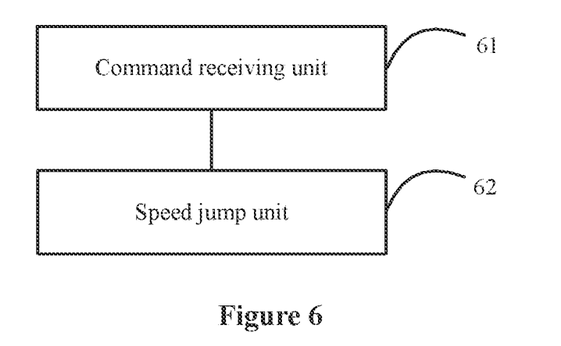
FIG. 6 shows a block diagram of a wind turbine of a wind farm according to an exemplary embodiment of the present disclosure.

FIG. 6 shows a block diagram of a wind turbine of a wind farm according to an exemplary embodiment of the present disclosure.

With reference to FIG. 6, the wind turbine of the wind farm includes a command receiving unit 61 and a speed jump unit 62.

The command receiving unit 61 is configured to receive an active power adjustment command sent by a power control apparatus of the wind farm.

The speed jump unit 62 is configured to perform a speed jump operation, according to a speed jump power, the active power adjustment command and a current real-time power of the wind turbine.

In an exemplary embodiment of the present disclosure, the speed jump unit 62 may be configured to perform the speed jump operation, if the speed jump power is less than a greater one of a single-turbine target power of the wind turbine and the current real-time power, and is greater than a less one of the single-turbine target power of the wind turbine and the current real-time power; and skip the speed jump operation, if the speed jump power is less than a less one of the single-turbine target power of the wind turbine and the current real-time power, or is greater than a greater one of the single-turbine target power of the wind turbine and the current real-time power.

In an exemplary embodiment of the present disclosure, the wind turbine may further include an available power adjustment unit (not shown). The available power adjustment unit is configured to adjust a current available maximum power or a current available minimum power of the wind turbine during a preset waiting period based on the speed jump power, according to a relationship between the current real-time power and the speed jump power, if the speed jump power is less than the greater one of the single-turbine target power of the wind turbine and the current real-time power, and is greater than a less one of the single-turbine target power of the wind turbine and the current real-time power.

In an exemplary embodiment of the present disclosure, the available power adjustment unit may be configured to adjust the current available maximum power of the wind turbine during the preset waiting period to be equal to the speed jump power, if the current real-time power is greater than the speed jump power and is less than the single-turbine target power of the wind turbine; and adjust the current available minimum power of the wind turbine during the preset waiting period to be equal to the speed jump power, if the current real-time power is less than the speed jump power and is greater than the single-turbine target power of the wind turbine.

In addition, a computer-readable storage medium is further provided according to an exemplary embodiment of the present disclosure. The computer-readable storage medium stores a computer program thereon, and the computer program, when executed, implements the power control method tier the wind farm according to the exemplary embodiment of the present disclosure.

In an exemplary embodiment of the present disclosure, the computer-readable storage medium may store one or more programs, and the computer programs, when executed, implement the following steps: calculate an adjustable power range for each wind turbine according to a current power output state of each wind turbine in the wind farm, in response to receiving a whole-farm active power adjustment signal for the wind farm sent by a power grid; and calculate a power allocated to each wind turbine based on the adjustable power range for each wind turbine and a whole-farm target power indicated by the whole-farm active power adjustment signal, so as to generate an active power adjustment command and send the generated active power adjustment command to each wind turbine.

In an exemplary embodiment of the present disclosure, the computer-readable storage medium may store one or more programs, and the computer programs, when executed, implement the following steps: receive an active power adjustment command sent from a power control apparatus for the wind farm; and perform a speed jump operation based on a speed jump power, the active power adjustment command and a current real-time power of the wind turbine.

The computer-readable storage medium may be but not limited to, for example, an electrical, magnetic, optical, electromagnetic, infrared, or semiconductor system, apparatus, or device, or any combination of the above. More specific examples of the computer-readable storage medium may include, but not limited to: an electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In an embodiment of the present disclosure, the computer-readable storage medium may be any tangible medium that contains or stores a computer program, and the computer program may be used by an instruction execution system, apparatus, or device or the combination of the above. The computer program contained on the computer-readable storage medium may be transmitted by any suitable medium, including but not limited to: wire, optical cable, RF (Radio Frequency) or the like, or any suitable combination of the above. The computer-readable storage medium may be included in any device; it may also exist alone without being assembled into the device.

A power control apparatus for a wind farm according to the exemplary embodiment of the present disclosure has been described above with reference to FIG. 5 and FIG. 6. Hereinafter, a computing apparatus for a wind farm according to an exemplary embodiment of the present disclosure will be described with reference to FIG. 7.

Figure 7:
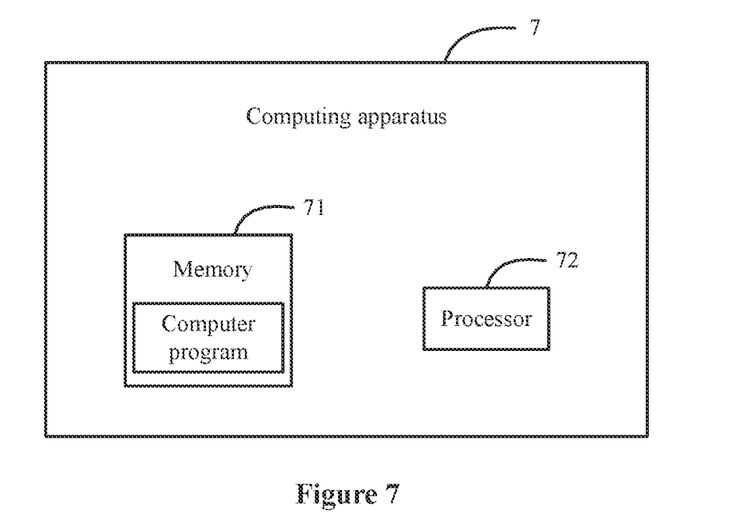
FIG. 7 shows a schematic diagram of a computing apparatus according to an exemplary embodiment of the present disclosure.

FIG. 7 shows a schematic diagram of a computing apparatus according to an exemplary embodiment of the present disclosure.

With reference to FIG. 7, the computing apparatus 7 includes a memory 71 and a processor 72. The memory 71 stores a computer program, and the computer program, when executed by the processor 72, implements the power control method for the wind farm according to the exemplary embodiment of the present disclosure.

In an exemplary embodiment of the present disclosure, the computer program, when executed by the processor 72, may implement the following steps: calculate an adjustable power range for each wind turbine according to a current power output state of each wind turbine in the wind farm, in response to receiving a whole-farm active power adjustment signal for the wind farm sent by a power grid; and calculate a power allocated to each wind turbine based on the adjustable power range for each wind turbine and a whole-farm target power indicated by the whole-farm active power adjustment signal, so as to generate an active power adjustment command and send the generated active power adjustment command to each wind turbine.

In an exemplary embodiment of the present disclosure, the computer program, when executed by the processor 72, may implement the following steps: receive an active power adjustment command sent from a power control apparatus for the wind farm; and perform a speed jump operation based on a speed jump power, the active power adjustment command and a current real-time power of the wind turbine.

The computing apparatus shown in FIG. 7 is only an example, and should not bring any limitation to the function and scope of use of the embodiments of the present disclosure.

In another exemplary embodiment of the present disclosure, a main controller for a wind turbine may include a processor and a memory. The memory stores a computer program. The computer program, when executed by the processor, may implement the following steps: receive an active power adjustment command sent from a power control apparatus for the wind farm; and perform a speed jump operation based on a speed jump power, the active power adjustment command and a current real-time power of the wind turbine.

The wind farm, the power control system for the wind farm, and the power control method and apparatus for the wind farm according to the exemplary embodiments of the present disclosure have been described above with reference to FIG. 2 to FIG. 7. However, it should be understood that the power control apparatus for the wind farm and its units shown in FIG. 5 to FIG. 6 may be configured to software for performing a specific function, hardware, firmware, or any combination of the above items. It should also be understood that the computing apparatus shown in FIG. 7 is not limited to include the components shown above, but also adds or removes some components as needed, and the above components may also be combined.

According to the wind farm, the power control system for the wind farm, the power control method and power control apparatus for the wind farm provided in the exemplary embodiments of the present disclosure, an adjustable power range for each wind turbine is calculated according to a current power output state of each wind turbine in the wind farm, in response to receiving a whole-farm active power adjustment signal for the wind farm sent by a power grid; and a power allocated to each wind turbine is calculated based on the adjustable power range for each wind turbine and a whole-farm target power indicated by the whole-farm active power adjustment signal, so as to generate an active power adjustment command and send the generated active power adjustment command to each wind turbine. The technical solution proposed in the present disclosure have the following advantages of: (1) realizing a control function of the flexible-tower wind farm in response to the active power dispatch in a full power range of the grid; (2) effectively ensuring the safety of the flexible-tower wind turbine during an speed jump operation, and avoiding frequent speed jump operations of the wind turbine when having not recovered to a normal state under an adjustment strategy of a farm-end apparatus to bring about safety risks; (3) preventing the wind turbine from being sent a shutdown command by the farm-end apparatus due to the speed protection of the flexible tower, which will lead to a slow start-up speed when increasing the power and cannot meet the grid assessment indicators. In addition, wind turbines may be divided into N groups. When the power adjustment range is large, a single group or a small number of groups will perform the speed jump action, which may, from the whole-farm perspective, reduce an impact of a large power fluctuation during the speed jump action on an accuracy error of the whole-farm active power output.

Although the present disclosure has been specifically shown and described with reference to its exemplary embodiments, those skilled in this art should understand that various changes in forms and details may be made on the present disclosure without departing from the spirit and scope of the present disclosure as defined by the claims.

The invention claimed is:

1. A power control method for a wind farm, performed by a power control apparatus for the wind farm, and comprising:
    calculating an adjustable power range for each wind turbine according to a current power output state of each wind turbine in the wind farm, in response to receiving a whole-farm active power adjustment signal for the wind farm sent by a power grid; and
    calculating a power allocated to each wind turbine based on the adjustable power range for each wind turbine and a whole-farm target power indicated by the whole-farm active power adjustment signal, so as to generate an active power adjustment command and send the generated active power adjustment command to each wind turbine, wherein the step of calculating the power allocated to each wind turbine based on the adjustable power range for each group of wind turbines and the whole-farm target power comprises:
    calculating a difference between the whole-farm target power and a whole-farm real-time power as a power adjustment range;
    calculating a ratio or a difference between the maximum increasable power or the maximum reducible power in the adjustable power range for each group of wind turbines and the power adjustment range, to acquire a proximity between the adjustable power range for each group of wind turbines and the power adjustment range;
    determining at least one group of wind turbines as wind turbines to be performed power adjustment according to the proximity, and
    setting the maximum increasable power or the maximum reducible power in the adjustable power range as the power to be allocated to the wind turbine, for each wind turbine determined to be performed power adjustment.

2. The power control method according to claim 1, wherein the step of calculating an adjustable power range for each wind turbine according to a current power output state of each wind turbine in the wind farm comprises the following steps performed on each wind turbine:
    calculating a difference between a current available maximum power of the wind turbine and a current power of the wind turbine as a maximum increasable power of the wind turbine; and
    calculating a difference between a current available minimum power of the wind turbine and the current power of the wind turbine as a maximum reducible power of the wind turbine,
    wherein, the adjustable power range of the wind turbine comprises the maximum increasable power and the maximum reducible power of the wind turbine.

3. The power control method according to claim 1, wherein the step of calculating a power allocated to each wind turbine based on the adjustable power range for each wind turbine and a whole-farm target power indicated by the whole-farm active power adjustment signal comprises:
    grouping wind turbines in the wind farm based on a total capacity of the wind farm;
    calculating an adjustable power range for each group of wind turbines according to adjustable power ranges for all wind turbines in the group; and
    calculating the power allocated to each wind turbine based on the adjustable power range for each group of wind turbines and the whole-farm target power.

4. A power control method for a wind farm, performed by a wind turbine and comprising:
    receiving the active power adjustment command generated by the power control method according to claim 1 from a power control apparatus for the wind farm; and
    performing a speed jump operation based on a speed jump power, the active power adjustment command and a current real-time power of the wind turbine.

5. The power control method according to claim 4, wherein the step of performing a speed jump operation based on a speed jump power, the active power adjustment command and a current real-time power of the wind turbine comprises:
    performing the speed jump operation, if the speed jump power is less than a greater one of a single-turbine target power of the wind turbine and the current real-time power, and is greater than a less one of the single-turbine target power of the wind turbine and the current real-time power; and skipping the speed jump operation, if the speed jump power is less than a less one of the single-turbine target power of the wind turbine and the current real-time power, or is greater than a greater one of the single-turbine target power of the wind turbine and the current real-time power.

6. The power control method according to claim 5, further comprising:

adjusting a current available maximum power or a current available minimum power of the wind turbine during a preset waiting period based on the speed jump power, according to a relationship between the current real-time power and the speed jump power, if the speed jump power is less than the greater one of the single-turbine target power of the wind turbine and the current real-time power, and is greater than a less one of the single-turbine target power of the wind turbine and the current real-time power.

7. The power control method according to claim 6, wherein the step of adjusting a current available maximum power or a current available minimum power of the wind turbine during a preset waiting period based on the speed jump power comprises:

adjusting the current available maximum power of the wind turbine during the preset waiting period to be equal to the speed jump power, if the current real-time power is greater than the speed jump power and is less than the single-turbine target power of the wind turbine; and adjusting the current available minimum power of the wind turbine during the preset waiting period to be equal to the speed jump power, if the current real-time power is less than the speed jump power and is greater than the single-turbine target power of the wind turbine.

8. A main controller for a wind turbine, comprising:
a processor; and
a memory, storing a computer program, wherein the computer program, when executed by the processor, implements the power control method for the wind farm according to claim 4.

9. A power control apparatus for a wind farm, comprising: a processor and a memory storing a computer program, wherein the processor when executing the computer program, is configured to:

calculate an adjustable power range for each wind turbine according to a current power output state of each wind turbine in the wind farm, in response to receiving a whole-farm active power adjustment signal for the wind farm sent by a power grid; and calculate a power allocated to each wind turbine based on the adjustable power range for each wind turbine and a whole-farm target power indicated by the whole-farm active power adjustment signal, so as to generate an active power adjustment command and send the generated active power adjustment command to each wind turbine:

calculating a difference between the whole-farm target power and a whole-farm real-time power as a power adjustment range;

calculating a ratio or a difference between the maximum increasable power or the maximum reducible power in the adjustable power range for each group of wind turbines and the power adjustment range, to acquire a proximity between the adjustable power range for each group of wind turbines and the power adjustment range;

determining at least one group of wind turbines as wind turbines to be performed power adjustment according to the proximity, and setting the maximum increasable power or the maximum reducible power in the adjustable power range as the power to be allocated to the wind turbine, for each wind turbine determined to be performed power adjustment.

10. The power control apparatus according to claim 9, wherein the processor when executing the computer program, is further configured to perform the following steps on each wind turbine:

calculate a difference between a current available maximum power of the wind turbine and a current power of the wind turbine as a maximum increasable power of the wind turbine; and calculate a difference between a current available minimum power of the wind turbine and the current power of the wind turbine as a maximum reducible power of the wind turbine, wherein, the adjustable power range of the wind turbine comprises the maximum increasable power and the maximum reducible power of the wind turbine.

11. The power control apparatus according to claim 9, wherein the processor when executing the computer program, is configured to:

group wind turbines in the wind farm based on a total capacity of the wind farm;

calculate an adjustable power range for each group of wind turbines according to adjustable power ranges for all wind turbines in the group; and calculate the power allocated to each wind turbine based on the adjustable power range for each group of wind turbines and the whole-farm target power.

12. A wind farm, comprising a farm-end command sending apparatus and at least one wind turbine, wherein the farm-end command sending apparatus comprises a processor and a memory for storing a computer program, wherein the processor when executing the computer program, is configured to:

receive a whole-farm active power adjustment signal for the wind farm sent by a power grid system;

calculate an adjustable power range for each wind turbine according to a current power output state of each wind turbine in the wind farm, in response to receiving the whole-farm active power adjustment signal for the wind farm sent by a power grid, and allocate power based on the adjustable power range for each wind turbine and a wind-farm target power indicated by the whole-farm active power adjustment signal; and send a power allocation result to each wind turbine, wherein each wind turbine of the at least one wind turbine comprises a wind turbine controller, and the wind turbine controller is configured to perform a speed jump operation, according to a speed jump power, the power allocation result sent by the farm-end command sending apparatus, and a current real-time power of the wind turbine, wherein the step of calculating the power allocated to each wind turbine based on the adjustable power range for each group of wind turbines and the whole-farm target power comprises:

calculating a difference between the whole-farm target power and a whole-farm real-time power as a power adjustment range;

calculating a ratio or a difference between the maximum increasable power or the maximum reducible power in the adjustable power range for each group of wind turbines and the power adjustment range, to acquire a proximity between the adjustable power range for each group of wind turbines and the power adjustment range;

determining at least one group of wind turbines as wind turbines to be performed power adjustment according to the proximity, and setting the maximum increasable power or the maximum reducible power in the adjustable power range as the power to be allocated to the wind turbine, for each wind turbine determined to be performed power adjustment.

* * * * *